(12) United States Patent
Gröschl et al.

(10) Patent No.: US 6,387,189 B1
(45) Date of Patent: May 14, 2002

(54) SURFACE-CLEANING METHOD

(75) Inventors: Andreas Gröschl, Leverkusen; Torsten Groth, Odenthal; Volker Hassmann, Krefeld; Jürgen Horn, Uedem; Ingo Janisch, Kürten; Winfried Joentgen, Köln; Bernhard Lehmann, Aachen; Wolfgang Zarges, Köln, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/269,568

(22) PCT Filed: Jan. 3, 1998

(86) PCT No.: PCT/EP98/00016

§ 371 Date: Mar. 30, 1999

§ 102(e) Date: Mar. 30, 1999

(87) PCT Pub. No.: WO98/30661

PCT Pub. Date: Jul. 16, 1998

(30) Foreign Application Priority Data

Jan. 9, 1997 (DE) .......................... 197 00 493

(51) Int. Cl.⁷ ................................. B08B 3/04
(52) U.S. Cl. ................. 134/26; 134/2; 134/3; 134/28; 134/36; 134/41; 134/42; 510/108; 510/219; 510/238; 510/240; 510/245; 510/275; 510/276; 510/475; 510/480; 510/495
(58) Field of Search ................. 134/26, 2, 41, 134/3, 28, 36, 42; 510/480, 108, 219, 238, 240, 245, 276, 275, 475, 495

(56) References Cited

U.S. PATENT DOCUMENTS

| | | | |
|---|---|---|---|
| 4,808,328 A | 2/1989 | Flohr ........................ | 252/106 |
| 4,839,461 A | 6/1989 | Boehmke ................... | 528/363 |
| 5,288,783 A | 2/1994 | Wood ........................ | 525/418 |
| 5,318,726 A | 6/1994 | Rossmaier et al. ......... | 252/546 |
| 5,371,180 A | 12/1994 | Groth et al. ................ | 528/363 |
| 5,703,033 A | * 12/1997 | Sherry et al. ............... | 510/237 |

FOREIGN PATENT DOCUMENTS

| | | |
|---|---|---|
| DE | 37 39 610 | 6/1989 |
| EP | 0 261 874 | 3/1988 |
| EP | 0 513 948 | 11/1992 |
| EP | 0 561 464 | 9/1993 |
| EP | 0 757 094 | 2/1997 |
| GB | 1 306 331 | 2/1973 |
| JP | 6/329607 | 11/1994 |
| JP | 6/330020 | 11/1994 |
| SU | 0639 863 | 12/1978 |
| WO | WO 95/16767 | 6/1995 |

OTHER PUBLICATIONS

Aachener Membrankolloquium, Preprints, S.41 (1991).
Permasep Engineering Manual, Bulletin 507, S. 1–4 (1982).
Desalination, 77, 135–179 (1990).
Desalination, 71, 325–335 (1989).
Vom Wasser, 67, 59–68 (1986).
J. Org. Chem. 24, pp. 1662–1666 (1959).
J. Org. Chem., 26, p. 1084 (1961).
English language abstract of DE 37 39 610 (from orbit).
English language version of EP 0 757 094.
English language abstract of SU 0639 863 (from orbit).

* cited by examiner

*Primary Examiner*—Sharidan Carrillo
(74) *Attorney, Agent, or Firm*—Connolly Bove Lodge & Hutz LLP

(57) ABSTRACT

A method of cleaning surfaces made of glass, graphite, ceramics, polymeric and metallic materials, synthetic and vegetable fibres, e.g. fabrics, textiles or waste paper, in particular membrane surfaces, by detaching or dissolving organic and inorganic soilings by a simple flushing operation, where a solution of an iminocarboxylic acid, a polyamino acid, an emulsifier or a mixture thereof is used.

21 Claims, No Drawings

SURFACE-CLEANING METHOD

BACKGROUND OF THE INVENTION

1. Field of the Invention

The present invention relates to a method of cleaning surfaces made of glass, graphite, ceramics, polymeric and metallic materials, synthetic and vegetable fibres, e.g. fabrics, textiles or waste paper, in particular membrane surfaces, by detaching or dissolving organic and inorganic soilings by a simple flushing operation.

Deposits of organic and inorganic impurities are a constant problem in industry and the home. Thus, the deposits lead, for example, to a reduction in flow rate or even to blockages in pipes, to contaminations in reactors or soilings on objects of everyday use.

Glassware is particularly susceptible to soilings and is a particular problem in the domestic sector. In order to maintain the operation of equipment and materials and hygiene, the cleaning of surfaces is an important procedure in many fields.

Membranes, as a specific example of surfaces, are used in a variety of ways in industry and in the medical field. For their use to be economical, it is important to maintain a high flow rate. Deposits on the membrane surface partially block the membrane, resulting in a reduced and uneconomical permeate flow. Cleaning compositions can be used to largely remove the soilings and increase the flow rate again.

2. Description of the Related Art

The Aachen membrane colloquium, preprints page 41 (1991) reports on the use of various flushing chemicals; only alkaline formulations which contain, for example, EDTA, phosphates, anionic and nonionic surfactants and enzymes lead to adequate cleaning performances. Citric acid and peracetic acid do not exhibit an adequate action.

Permasep Engineering Manual, Bulletin 507, page 1–4 (1982) describes various cleaning compositions and cleaning procedures for cleaning membranes. The cleaning compositions proposed were frequently standard commercial cleaning compositions, which are a complex mixture of very many different active components.

Desalination, 77, 135–179 (1990) reports on flushing procedures for various applications of ultrafiltration, where purification is in some instances necessary after an operating period of just a few hours.

A list of cleaning compositions and their activity mechanisms is given in Desalination, 71, 325–335 (1989), and the need to use a variety of cleaning compositions in a certain sequence to achieve satisfactory cleaning performances is emphasized in particular.

The specialist journal Vom Wasser, 67, 59–68 (1986) reports on the optimization of flushing processes during water treatment using reverse osmosis plants, where the aim is to use chemically pure surfactants instead of formulated cleaning compositions. The investigations showed that a combination of EDTA and a formulated cleaning composition produced inferior performances than EDTA on its own.

EP 0 513 948 describes the cleaning of hard surfaces by a cleaning composition that is composed of a variety of components and inter alia comprises a complexing agent and an organic solvent.

EP 0 261 874 discloses a cleaning composition for hard surfaces which comprises EDTA and an alkanesulphonate. U.S. Pat. No. 4,808,328 likewise discloses cleaning compositions for hard surfaces which, in addition to EDTA, comprise an alkanesulphonate.

It is a common feature of all cleaning compositions and in particular all membrane cleaners which cover a broad field of use that they are composed of a complex mixture of many different cleaning chemicals and auxiliaries, and even that in most cases a flushing procedure with various cleaning compositions has to be carried out in a certain sequence for effective cleaning. In particular, most formulated membrane cleaners contain phosphates or phosphonates to improve the membrane cleaning performance.

BRIEF SUMMARY OF THE INVENTION

Surprisingly, it has now been found that the use of a cleaning composition which comprises at least one component selected from the group consisting of i) iminodisuccinic acid of the formula (I)

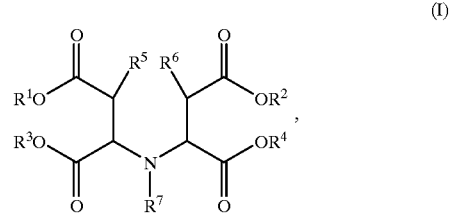

in which $R^1$, $R^2$, $R^3$ and $R^4$ independently of one another are H, Li, Na, K, $NH_4$, $H_3NCH_2CH_2OH$, $H_2N(CH_2CH_2OH)_2$ or $HN(CH_2CH_2OH)_3$, $R^5$ and $R^6$ independently of one another are H or OH, and $R^7$ is H, $CH_2CH_2OH$, $CH_2CH_2CH_2OH$, $CH_2CH(OH)CH_3$, $CH_2COOR^8$ or $CH_2CH_2COOR^8$, where $R^8$ independently of $R^1$ has the scope of meanings of $R^1$, ii) polyamino acid or iii) emulsifier, by a simple flushing operation (no procedure with various cleaners in sequence) achieves significantly better cleaning performances on surfaces, in particular membrane surfaces, than does the use of cleaners recommended in the literature. In addition, better cleaning performances are also achieved than when phosphate- and phosphonate-containing cleaners are used.

DETAILED DESCRIPTION OF THE INVENTION

The invention relates to a method of cleaning surfaces made of glass, graphite, ceramics, polymeric and metallic materials, synthetic and vegetable fibres, and membranes by detaching or dissolving organic or inorganic soilings or a mixture of the two by a simple flushing operation with a solution of a cleaning composition at, in particular, 10–100° C. and a pH of in particular 3–13, which is characterized in that the cleaning composition used is at least one component selected from the group consisting of i) iminodisuccinic acid of the formula (I)

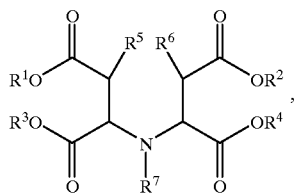

(I)

in which
R$^1$, R$^2$, R$^3$ and R$^4$ independently of one another are H, Li, Na, K, NH$_4$, H$_3$NCH$_2$CH$_2$OH, H$_2$N(CH$_2$CH$_2$OH)$_2$ or HN(CH$_2$CH$_2$OH)$_3$,
R$^5$ and R$^6$ independently of one another are H or OH, and
R$^7$ is H, CH$_2$CH$_2$OH, CH$_2$CH$_2$CH$_2$OH, CH$_2$CH(OH)CH$_3$, CH$_2$COOR$^8$ or CH$_2$CH$_2$COOR$^8$, where R$^8$ independently of R$^1$ has the scope of meanings of R$^1$,
ii) polyamino acid or
iii) emulsifier,
comprises and the solvent used is water or a mixture of water and a C$_1$–C$_4$-alcohol or a C$_3$–C$_4$-ketone.

The invention further relates to a composition for cleaning surfaces made of glass, graphite, ceramics, polymeric and metallic materials, synthetic and vegetable fibres and membranes, based on at least one component selected from the group consisting of i) iminodisuccinic acid of the formula (I)

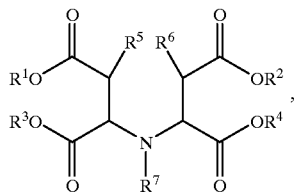

(I)

in which
R$^1$, R$^2$, R$^3$ and R$^4$ independently of one another are H, Li, Na, K, NH$_4$, H$_3$NCH$_2$CH$_2$OH, H$_2$N(CH$_2$CH$_2$OH)$_2$ or HN(CH$_2$CH$_2$OH)$_3$,
R$^5$ and R$^6$ independently of one another are H or OH, and
R$^7$ is H, CH$_2$CH$_2$OH, CH$_2$CH$_2$CH$_2$OH, CH$_2$CH(OH)CH$_3$, CH$_2$COOR$^8$ or CH$_2$CH$_2$COOR$^8$, where R$^8$ independently of R$^1$ has the scope of meanings of R$^1$,
ii) polyamino acid or
iii) emulsifier
and a solvent from the group consisting of water and a mixture of water and a C$_1$–C$_4$-alcohol or a C$_3$–C$_4$-ketone, where the solvent constitutes in particular 40–99.9% by weight, preferably 50–99% by weight, particularly preferably 60–90% by weight of the total composition.

The emulsifiers to be used according to the invention are preferably C$_8$–C$_{25}$-alkanesulphonates, particularly preferably C$_{10}$–C$_{20}$-alkanesulphonates, very particularly preferably C$_{12}$–C$_{18}$-alkanesulphonates. It is also preferable to use linear alkanesulphonates.

The iminodisuccinic acids of the formula (I) to be used according to the invention are used in aqueous solution.

Preferably, R$^6$ is H, and particularly preferably R$^5$ and R$^6$ are H. In a likewise preferred manner, R$^7$ is H. In a further preferred manner R$^5$, R$^6$ and R$^7$ are H, so that (I) represents the unsubstituted iminodisuccinic acid (IDS) and its salts of the above-described type.

In a further preferred manner, the radicals R$^{11}$, R$^{12}$, R$^{13}$ and R$^{14}$ appear in the position of R$^1$, R$^2$, R$^3$ and R$^4$ and have the meaning H, Na, K, NH$_4$ or H$_3$NCH$_2$CH$_2$OH.

The iminodisuccinic acids of the formula (I) used according to the invention are in pure form or are combined with small amounts of secondary components from the preparation of (I), such as maleic acid, fumaric acid, aspartic acid, malic acid, asparagine, tartaric acid, hydroxyaspartic acid, condensates of aspartic acid etc. or their salts containing the above mentioned cations R$^1$ to R$^4$. The secondary components are present in the mixture in an amount of at most 35% by weight, preferably 30% by weight and particularly preferably 25% by weight; the remainder to 100% by weight is (I).

(I) is prepared by known methods in aqueous medium, for example from maleic anhydride, maleic acid or epoxysuccinic acid and ammonia or aspartic acid. Methods of this type are described, for example, in GB 1 306 331, SU 0 639 863, JP 6/329 607, JP 6/330 020 and DE 37 39 610.

The polyamino acids according to the invention are, for example, homo- and copolymers of lysine, glutamic acid, alanine and aspartic acid, and protein hydrolysates.

Preference is given to using polyaspartic acids or polymers with repeat succinyl units, which can either be prepared from aspartic acid or from maleic anhydride, its derivatives and ammonia.

In a preferred embodiment, the polyamino acids to be used according to the invention are polymers with repeat succinyl units which have at least one of the following repeat structural units:

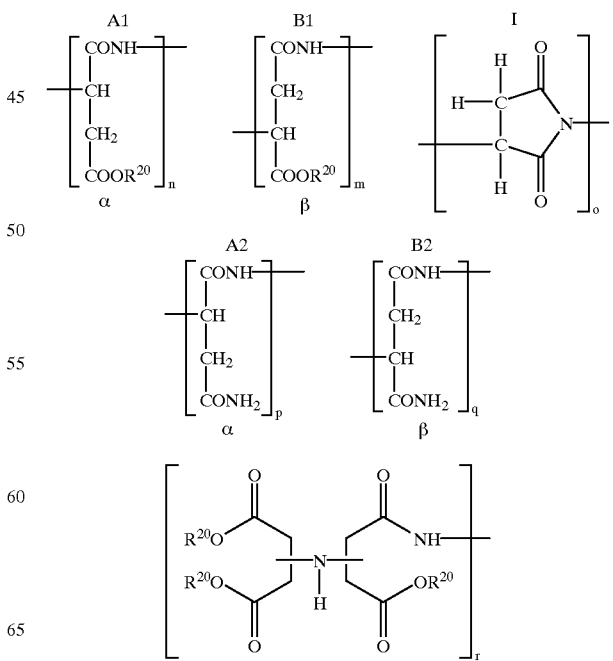

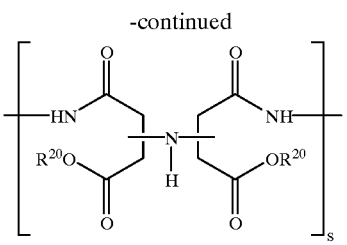

where the following statements apply:

$R^{20}$ is H or is a cation, in particular alkali metal, ammonium, independently of one another where two or more are present, n, m, o is 0 or an integer from 1 to 300, p, q is 0 or an integer from 1 to 10, r is 0 or an integer 1 or 2, s is 0 or an integer from 1 to 10, and n+m+o+p+q is $\leq 300$, where the indices n, m, o, p, q, r and s indicate how many units are present in the polymer, optionally in random distribution.

The polymers to be used according to the invention are taken to mean the corresponding free acids, their salts and also derivatives of the acids, in particular anhydrides.

In a particularly preferred embodiment, the repeat unit B1 is present, based on the total of units B1 and A1, to at least 50%, in particular to at least 70%.

The average molecular weight (MW) can fluctuate within a wide range, it being possible to use polyaspartic acids having molecular weights between 500 and 100,000 g/mol, but preference is given to from 1000 to 50,000 g/mol or, even better 1000 to 30,000 g/mol.

The molecular weight is determined using gel permeation chromatography (GPC) in LiChrospher diol acids (Merck) and using phosphate buffer (pH=7) as eluent solution. Calibration is best carried out using pure polyaspartic acid, e.g. Sigma, the molecular weight of which has been determined by an absolute measuring method, for example LALLS.

The polymers with repeat succinyl units to be used according to the invention are, in a preferred embodiment, essentially polyaspartic acids. The polymers can be prepared by known processes, for example in accordance with U.S. Pat. No. 4,839,461, U.S. Pat. No. 5,371,180, U.S. Pat. No. 5,288,783, J. Org. Chem., 24, p 1662–1666 (1959) and J. Org. Chem., 26, 1084 (1961).

The emulsifiers, iminocarboxylic acids and polyamino acids can be used alone or as mixtures. The mixture proportions (proportions by mass) of emulsifier, preferably $C_8$–$C_{25}$-alkanesulphonate, and iminocarboxylic acid or polyamino acid are in the range from 99:1 to 1:99, preferably from 20:80 to 80:20, particularly preferably from 40:60 to 60:40.

The mixing proportions of iminocarboxylic acid and polyamino acids are likewise in the range from 99:1 to 1:99, preferably from 20:80 to 80:20, particularly preferably from 40:60 to 60:40.

The cleaning composition concentrates according to the invention are used with a water content of from 99.9% by weight to 40% by weight, preferably from 95% by weight to 50% by weight, particularly preferably from 95% by weight to 60% by weight.

The cleaning compositions according to the invention are used at a pH of 3–13, preferably 4–12, particularly preferably 4.5–11.5, and at temperatures of 10–100° C., preferably 15–85° C.

The cleaning compositions according to the invention are used for cleaning surfaces made of glass, graphite, ceramics, polymeric and metallic materials, synthetic and vegetable fibres, e.g. fabrics, textiles or waste paper, in particular for cleaning membrane surfaces.

Membranes which are cleaned according to the invention are those which are preferably used in pressure permeation techniques. The membranes can be made of the following materials: cellulose esters, such as, for example, cellulose acetate, cellulose acetopropionate, cellulose acetobutyrate, polyolefins, such as polyethylene or rpolypropylene, copolymers of ethylene and $C_3$–$C_8$-olefins, polyimides, polyamides, polyphenylenesulphones, polyphenylene ethers, polyphenylenesulphonic esters, polyphenylene ether esters, ceramics, $SiO_2$, carbon, polypiperazinamide, polytetrafluoroethylene (PTFE), polyvinylidene fluoride (PVDF), polyacrylonitrile (PAN), polysulphone.

The membrane to be cleaned or the membrane module to be cleaned is treated with an aqueous, aqueous-alcoholic, aqueous-ketonic, or aqueous-alcoholic-ketonic solution of the emulsifier, the iminocarboxylic acid, the polyamino acid or a mixture thereof, optionally with addition of standard commercial cleaning composition enzymes, such as, for example, proteases, lipases or amylases, in a manner which involves pumping such a solution over the membrane surface or through the membrane module. A suitable alcohol is $C_1$–$C_4$-alcohol, such as methanol, ethanol, propanol, i-propanol, butanol, i-butanol, preferably methanol, ethanol, i-propanol. A suitable ketone is acetone ($C_3$) or methyl ethyl ketone ($C_4$). Of these organic solvents, alcohols are preferred. The duration of the cleaning treatment is obviously dependent, in a manner familiar to the person skilled in the art, on the degree of soiling, on the intensity of the recirculation, on the concentration of the cleaning solution and, where present, on the said ingredients and also on the temperature. The extent of cleaning can be controlled by determining the flow rate through the membrane.

The cleaning composition according to the invention is prepared by simply dissolving the emulsifier and/or the iminodisuccinic acid of the formula (I) and/or the polyamino acid and optionally the alkali carrier or the enzyme or a plurality of such substances in water, a water/alcohol mixture, a water/ketone mixture or a water/alcohol/ketone mixture in the stated amounts and ratios. For storage or for dispatch purposes, a mixture of dry substances, for example flake material from a drying roller or spray-dry granules, can be prepared. Where liquid substances are used, for example highly concentrated alkali metal hydroxide solution or ethanolamine, a 10 to 60% strength by weight solution, for example, can be used for storage and dispatch.

In addition, the cleaning solution according to the invention can comprise other components, such as, for example, enzymes, alcohols, solubility promoters and auxiliaries and fragrances.

The cleaning performance of the cleaning compositions according to the invention may be demonstrated by the following examples:

EXAMPLE 1

An aqueous solution consisting of 30% by weight of $H_2SO_4$, 30% by weight of naphthalenesulphonic acid and 40% by weight of water was diafiltered in a batch operation at an operating pressure of 60 bar and an operating temperature of 40° C. for 20 hours, and then the membrane separation efficiency was determined under standard conditions (1000 mg/l of $Na_2SO_4$, 25 bar, 30° C.). The module used was a spiral module. The module was then flushed with 50 l of an aqueous solution consisting of 0.5% by weight of the above emulsifier, 0.5% by weight of IDS Na salt and 99% by weight of water without pressure and with recirculation at 40° C. and a feed flow rate of 1.2 m³/h for 30 minutes, and the membrane separation efficiency was then determined again under standard conditions (1000 mg/l of $Na_2SO_4$, 25 bar, 30° C.). As a result of the flushing, the module separation efficiency under standard conditions was increased by 5%, with a simultaneous decrease in the passage of salt from 5.4% to 2.2%.

EXAMPLE 2

An aqueous solution consisting of 7% by weight of the sodium salt of flavonic acid and traces of impurities were concentrated batchwise using reverse osmosis to 50% of the starting volume at an operating pressure of 40 bar and an operating temperature of 40° C. The module used was that from Example 3. The module was then flushed with 50 l of an aqueous solution consisting of 0.5% by weight of the above emulsifier, 0.5% by weight of EDTA and 99% by weight of water without pressure and with recirculation at 40° C. and a feed flow rate of 1.2 m³/h for 30 minutes, and the membrane separation efficiency was determined under standard conditions (1000 mg/l of $Na_2SO_4$, 25 bar, 30° C.). A further flushing operation was carried out with 50 l of an aqueous solution consisting of 0.5% by weight of the above emulsifier, 0.5% by weight of IDS Na salt and 99% by weight of water without pressure with recirculation at 40° C. and a feed flow rate of 1.2 m³/h for 30 minutes, and the membrane separation efficiency was again measured under standard conditions. As a result of the second flushing with IDS Na salt, the module separation efficiency under standard conditions was increased by a further percentage point compared with the first flushing, with a salt passage of 0.3%.

COMPARATIVE EXAMPLE 1

Example 1 was repeated. However, the flushing solution used was 10 l of an aqueous solution consisting of 1.5% by weight of Ultrasil 40® (commercial product from Henkel, Düsseldorf, consisting essentially of organic complexing agents and alkali carriers) and 98.5% by weight of water; flushing was carried out at 40° C. and a feed flow rate of 1.2 m³/h for 20 minutes without pressure with recirculation. The module separation efficiency was then determined again under standard conditions. After waste water from Example 1 had been passed through the module, a reduction in the permeate flow to 64% of the permeate flow under standard conditions prior to passing through the waste water, with an unchanged salt passage (concentration in the feed/concentration in the permeate) of 2.9% was found. As a result of the flushing, the module separation efficiency was increased only to 83% of the permeate flow under standard conditions prior to passing through the waste water, with a salt passage of 2.9%. As a result of a subsequent further flushing with 10 l of an aqueous solution consisting of 0.15% by weight of the above emulsifier, 0.25% by weight of EDTA and 99.6% by weight of water at 40° C. and a feed flow rate of 1.2 m³/h for 20 minutes without pressure and with recirculation, the permeate flow was increased to 98% of the permeate flow under standard conditions prior to passing through the waste water, i.e. almost to the initial performance, with an unchanged salt passage (concentration in the feed/concentration in the permeate) of 2.9%.

COMPARATIVE EXAMPLE 2

Example 1 was repeated. However, the flushing solution used was 10 l of an aqueous solution consisting of 1% by weight of Ultrasil 10® (commercial product from Henkel, Düsseldorf consisting essentially of Na acetate, Na sulphate, Na phosphate, alkylbenzenesulphonate and EDTA) and 99% by weight of water at 40° C. and a feed flow rate of 1.2 m³/h for 20 minutes without pressure and with recirculation. The module separation efficiency was then determined again under standard conditions. After waste water from Example 1 had been passed through the module, a reduction in the permeate flow to 65% of the permeate flow under standard conditions prior to passing through the waste water with an unchanged salt passage (concentration in the feed/concentration in the permeate) of 2.1% was found. As a result of the flushing, the module separation efficiency was increased only to 87% of the permeate flow under standard conditions prior to passing through the waste water, with a salt passage of 1.9%.

EXAMPLE 3

An aqueous solution of an optical brightener which was contaminated with antifoam grease was treated batchwise at an operating pressure of 30 bar and an operating temperature of 50° C. over a period of 10 h, permeate and concentrate being returned to the initial charge.

The solution was then drained off, flushing with water was carried out, and the pure water flow was determined under standard conditions (25° C., 20 bar). The module used was a plate module which, after the pure water flow had been determined, was flushed with 10 l of an aqueous solution consisting of 0.5% by weight of the above emulsifier, 0.25% by weight of polyaspartic acid Na salt and 99.25% by weight of water at 40° C. for 20 minutes without pressure and with recirculation. The pure water flow was then measured again under standard conditions (25° C., 20 bar). As a result of the cleaning, the permeate output under standard conditions was increased by 15% compared with the permeate output prior to flushing.

COMPARATIVE EXAMPLE 3

Example 3 was repeated. However, the flushing solution used was an aqueous solution consisting of 0.5% by weight of Ultraperm 091® (commercial product from Henkel, consisting of anionic and amphoteric surfactants, alkali and complexing agents) and 99.5% by weight of water. Flushing was carried out at 40° C. for 20 minutes without pressure and with recirculation. Here too, the pure water flow was then determined under standard conditions. As a result of the cleaning, the permeate output under standard conditions was increased by 6% compared with the permeate output prior to flushing. In Example 3, by contrast, an increase in the permeate output of 15% was achieved.

EXAMPLE 4

An aqueous chromium-containing mother liquor from the dye production was treated at an operating pressure of 30 bar and a temperature of 25° C. over a period of 12 hours, permeate and retentate being recycled for 3 h both at the start and at the end. In between, permeate was removed resulting in concentration. After 12 h, the solution was drained off, flushing with water was carried out, and the pure water flow was determined under standard conditions (25° C., 20 bar). The module used was a plate module which, after the pure water flow had been determined, was flushed with 10 l of an aqueous solution consisting of 0.5% by weight of the above emulsifier, 0.25% by weight of iminodisuccinate Na salt and 99.25% by weight of water at 40° C. for 20 minutes without pressure and with recirculation. The pure water flow was then measured again under standard conditions (25° C., 20 bar). As a result of the cleaning, the permeate output under standard conditions was increased by 21% compared with the permeate output prior to flushing.

COMPARATIVE EXAMPLE 4

Example 4 was repeated. However, the flushing solution used was an aqueous solution consisting of 0.5% by weight of Ultraperm 091® (commercial product from Henkel, consisting of anionic and amphoteric surfactants, alkali and complexing agents) and 99.5% by weight of water. Flushing was carried out at 40° C. for 20 minutes without pressure and with recirculation. Here too, the pure water flow was then determined under standard conditions. As a result of the cleaning, the permeate output under standard conditions was increased by 8% compared with the permeate output prior to flushing. In Example 4, by contrast, an increase in the permeate output of 21% was achieved.

What is claimed is:

1. A method of cleaning a surface made of at least one material selected from the group consisting of glass, graphite, ceramics, polymeric materials, metallic materials, and fibers by detaching or dissolving organic soilings, inorganic soilings or a mixture of the two present on said surface by a flushing>operation with a solution consisting of either i), ii) and iv); or i), ii), iii) and iv); wherein i), ii), iii) and iv) are as shown below:

i) an ininodisuccinic acid of the formula (I)

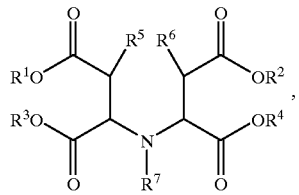
(I)

in which
R$^1$, R$^2$, R$^3$ and R$^4$ independently of one another are H, Li, Na, K, NH$_4$, H$_3$NCH$_2$CH$_2$OH, H$_2$N(CH$_2$CH$_2$OH)$_2$ or HN(CH$_2$CH$_2$OH)$_3$,
R$^5$ and R$^6$ independently of one another are H or OH, and
R$^7$ is H, CH$_2$CH$_2$OH, CH$_2$CH$_2$CH$_2$OH, CH$_2$CH(OH)CH$_3$, CH$_2$COOR$^8$ or CH$_2$CH$_2$COOR$^8$, where R$^8$ is H, Li, Na, K, NH$_4$, H$_3$NCH$_2$CH$_2$OH, H$_2$N(CH$_2$CH$_2$OH)$_2$ or HN(CH$_2$CH$_2$OH)$_3$, ii) a polyamino acid, iii) an emulsifier, iv) water.

2. A method according to claim 1, wherein the polyamino acid is a polymer which has at least one of the following repeat structural units

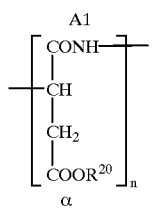 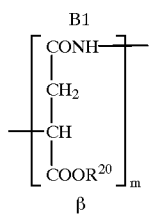 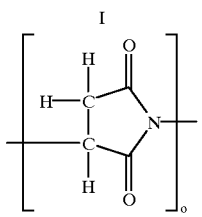

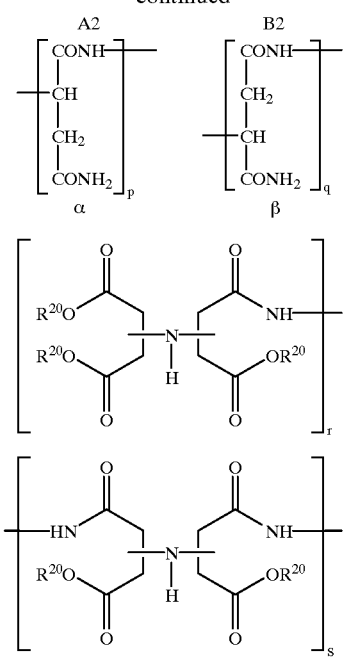

wherein,

R$^{20}$ is H or is a cation, independently of one another where R$^{20}$ is present more than once, n, m, o is 0 or an integer from 1 to 300, p, q is 0 or an integer from 1 to 10, r is 0 or an integer 1 or 2, s is 0 or an integer from 1 to 10, and n+m+o+p+q is ≦300, where the indices n, m, o, p, q, r and s indicate how many units are present in the polymer.

3. A method according to claim 1, wherein the emulsifier is a C$_8$–C$_{25}$-alkanesulphonate.

4. A method according to claim 1, wherein the flushing operation is carried out with the solution at a temperature of 10–100° C.

5. A method according to claim 1, wherein the flushing operation is carried out with the solution at a pH of 4–12.

6. A method according to claim 1, wherein the fibers are selected from the group consisting of synthetic fibers and vegetable fibers.

7. A method according to claim 1, wherein the flushing operation is carried out at a pH of 3 to 13.

8. A method according to claim 2, wherein when R$^{20}$ is a cation, it is selected from the group consisting of an alkali metal cation and an ammonium cation.

9. A composition for cleaning a surface made of at least one material selected from the group consisting of glass, graphite, ceramics, polymeric materials, metallic materials, and fibers, said composition consisting of either i), ii) and iv); or i), ii), iii) and iv); wherein i), ii), iii) and iv) are as shown below:

i) an iminodisuccinic acid of the formula (I)

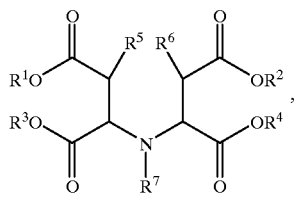

in which
R$^1$, R$^2$, R$^3$ and R$^4$ independently of one another are H, Li, Na, K, NH$_4$, H$_3$NCH$_2$CH$_2$OH, H$_2$N(CH$_2$CH$_2$OH)$_2$ or HN(CH$_2$CH$_2$OH)$_3$,
R$^5$ and R$^6$ independently of one another are H or OH, and
R$^7$ is H, CH$_2$CH$_2$OH, CH$_2$CH$_2$CH$_2$OH, CH$_2$CH(OH)CH$_3$, CH$_2$COOR$^8$ or CH$_2$CH$_2$COOR$^8$, where R$^8$ is H, Li, Na, K, NH$_4$, H$_3$NCH$_2$CH$_2$OH, H$_2$N(CH$_2$CH$_2$OH)$_2$ or HN(CH$_2$CH$_2$OH)$_3$, ii) a polyamino acid, iii) an emulsifier, iv) water.

10. A composition according to claim 9, wherein said composition consists of the iminodisuccinic acid of formula (I), the polyamino acid and water, farther wherein the mass ratio of the iminodisuccinic acid to the polyamino acid is from 99:1–1:99.

11. A composition according to claim 9, wherein the surface to be cleaned is a surface of a membrane.

12. A composition according to claim 9, wherein the fibers are selected from the group consisting of synthetic fibers and vegetable fibers.

13. A composition according to claim 9, wherein the emulsifier is a C$_8$–C$_{25}$-alkanesulphonate.

14. A method of cleaning a surface of a membrane by detaching or dissolving organic soilings, inorganic soilings or a mixture of the two present on said surface by a flushing operation with a solution consisting of either i), ii) and iv); or i), ii), iii) and iv); wherein i), ii), iii) and iv) are as shown below:

i) an iminodisuccinic acid of the formula (I)

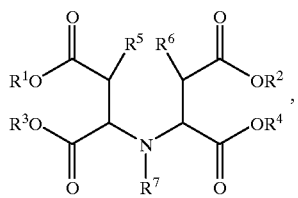

in which
R$^1$, R$^2$, R$^3$ and R$^4$ independently of one another are H, Li, Na, K, NH$_4$, H$_3$NCH$_2$CH$_2$OH, H$_2$N(CH$_2$CH$_2$OH)$_2$ or HN(CH$_2$CH$_2$OH)$_3$,
R$^5$ and R$^6$ independently of one another are H or OH, and
R$^7$ is H, CH$_2$CH$_2$OH, CH$_2$CH$_2$CH$_2$OH, CH$_2$CH(OH)CH$_3$, CH$_2$COOR$^8$ or CH$_2$CH$_2$COOR$^8$, where R$^8$ is H, Li, Na, K, NH$_4$, H$_3$NCH$_2$CH$_2$OH, H$_2$N(CH$_2$CH$_2$OH)$_2$ or HN(CH$_2$CH$_2$OH)$_3$, ii) a polyamino acid, iii) an emulsifier, iv) water.

15. A method according to claim 14, wherein the membrane consists of a material selected from the group consisting of cellulose esters, polyolefins, polyimides, polyamides, polyphenylenesulphones, polyphenylene ethers, polyphenylenesulphonic esters, polyphenylene ether esters, ceramics, SiO$_2$, carbon, polypiperazinamides, polytetrafluoroethylene, polyvinylidene fluoride, polyacrylonitrile and polysulphones.

16. A method according to claim 14, wherein the polyamino acid is a polymer which has at least one of the following repeat structural units

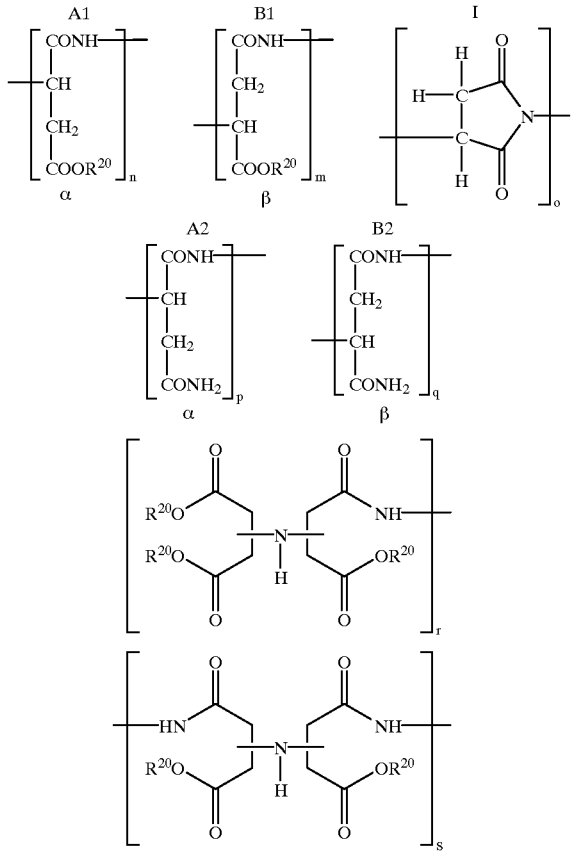

wherein,
R$^{20}$ is H or is a cation, independently of one another where R$^{20}$ is present more than once,
n, m, o is 0 or an integer from 1 to 300,
p, q is 0 or an integer from 1 to 10,
r is 0 or an integer 1 or 2,
S is 0 or an integer from 1 to 10, and
n+m+o+p+q is ≦300, where the indices n, m, o, p, q, r and s indicate how many units are present in the polymer.

17. A method according to claim 14, wherein the emulsifier is a C$_8$–C$_{25}$-alkanesulphonate.

18. A method according to claim 14, wherein the flushing operation is carried out with the solution at a temperature of 10–100° C.

19. A method according to claim 14, wherein the flushing operation is carried out with the solution at a pH of 4–12.

20. A composition for cleaning a surface made of at least one material selected from the group consisting of glass, graphite, ceramics, polymeric materials, metallic materials, and fibers, said composition consisting of:

i) an iminodisuccinic acid of the formula (I)

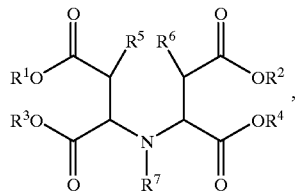
(I)

in which $R^1$, $R^2$, $R^3$ and $R^4$ independently of one another are H, Li, Na, K, $NH_4$, $H_3NCH_2CH_2OH$, $H_2N(CH_2CH_2OH)_2$ or $HN(CH_2CH_2OH)_3$, $R^5$ and $R^6$ independently of one another are H or OH, and $R^7$ is H, $CH_2CH_2OH$, $CH_2CH_2CH_2OH$, $CH_2CH(OH)CH_3$, $CH_2COOR^8$ or $CH_2CH_2COOR^8$, where $R^8$ is H, Li, Na, K, $NH_4$, $H_3NCH_2CH_2OH$, $H_2N(CH_2CH_2OH)_2$ or $HN(CH_2CH_2OH)_3$, ii) a polyamino acid,
iii) an emulsifier, and
iv) water.

21. A composition according to claim 20, wherein the emulsifier is a $C_8$–$C_{25}$-alkanesulphonate.

* * * * *

UNITED STATES PATENT AND TRADEMARK OFFICE
CERTIFICATE OF CORRECTION

PATENT NO. : 6,387,189 B1
DATED : May 14, 2002
INVENTOR(S) : Gröschl et al.

It is certified that error appears in the above-identified patent and that said Letters Patent is hereby corrected as shown below:

Column 9,
Line 24, delete ">".
Line 28, change "ininodisuccinic" to -- iminodisuccinic --.

Column 11,
Line 29, change "farther" to -- further --.

Signed and Sealed this

First Day of July, 2003

JAMES E. ROGAN
*Director of the United States Patent and Trademark Office*